United States Patent [19]

Bassous et al.

[11] 4,047,184
[45] Sept. 6, 1977

[54] CHARGE ELECTRODE ARRAY AND COMBINATION FOR INK JET PRINTING AND METHOD OF MANUFACTURE

[75] Inventors: Ernest Bassous, Riverdale; Lawrence Kuhn, Ossining, both of N.Y.

[73] Assignee: International Business Machines Corporation, Armonk, N.Y.

[21] Appl. No.: 653,168

[22] Filed: Jan. 28, 1976

[51] Int. Cl.² .............................................. G01D 15/18
[52] U.S. Cl. ...................................... 346/75; 156/661; 346/140 R
[58] Field of Search .................... 346/75, 140; 156/11; 317/3

[56] References Cited

U.S. PATENT DOCUMENTS

| | | | |
|---|---|---|---|
| 3,921,916 | 11/1975 | Bassous | 346/75 X |
| 3,949,410 | 4/1976 | Bassous et al. | 346/75 |
| 3,958,255 | 5/1976 | Chiou et al. | 346/75 X |
| 3,984,843 | 10/1976 | Kuhn | 346/75 |

Primary Examiner—Joseph W. Hartary
Attorney, Agent, or Firm—Edward S. Drake

[57] ABSTRACT

A charge electrode array for use in an ink jet printing apparatus is formed by anisotropic etching of apertures through a single crystal silicon substrate of (110) orientation. Conductive diffusion layers in the walls of and adjacent to the apertures permit a charge to be placed on a jet stream passing through the apertures. Contacts can be formed on the adjacent diffusion layers to provide connection to an externally located charging circuit or the contacts may be omitted when the charging circuit is formed in the substrate itself and connected by diffusion or a metal layer to each adjacent diffusion layer. Jet nozzles and synchronization electrodes are shown incorporated in the charge electrode array to form a monolithic structure capable of performing a plurality of functions. Substrate contacts are also provided for biasing.

30 Claims, 14 Drawing Figures

CHARGE ELECTRODE ARRAY AND COMBINATION FOR INK JET PRINTING AND METHOD OF MANUFACTURE

BACKGROUND OF THE INVENTION

In the conventional ink jet recording system, ink emerges from one or more exit orifices of a nozzle array which is connected to a source of high pressure fluid. The ink jet is then caused to be broken up into a stream of synchronized drops by application of a periodic perturbation at the nozzle caused by an electromechanical transducer or a voltage applied to a synchronization electrode associated with the exit orifice. The synchronization electrode establishes an electric field which electrohydrodynamically perturbs the jet stream emerging from the jet nozzle structure. A charge electrode is positioned near the point of drop formation so that when a voltage is supplied to the charge electrode, a charge is drawn out to the tip of the jet. As the drop breaks off from the jet, it carries with it a charge proportional to the voltage applied to the charge electrode. The drops then leave the area of the charge electrode and pass through deflection plates onto a target paper or a catcher or gutter, depending upon whether the drops at this stage are charged or uncharged.

Nozzles for ink jet recorders take on a variety of forms and a number of processes are known for making them. For example, U.S. Pat. No. 3,921,916, which issued to Ernest Bassous on Nov. 25, 1975, discloses a process for fabricating membrane-type silicon nozzles. As indicated there, the nozzles are formed in crystallographically oriented monocrystalline silicon or similar material using anisotropic etching. U.S. Pat. No. 3,958,255, which issued to Charles Chiou et al on May 18, 1976 there is disclosed a novel nozzle structure and method for its fabrication using single crystal material oriented with the (100) planes parallel to the surface.

The challenge of accomplishing integrated or monolithic units in ink jet recorders has been met in various ways. Thus, in pending application Ser. No. 591,982, filed June 30, 1975, to G. J. Fan, et al, a magnetic transducer driven by a transformer is physically placed on the nozzle substrate. In U.S. Pat. No. 3,949,410, which issued to Ernest Bassous et al on Apr. 6, 1976, et al, the exit aperture of the nozzle opens into a slot whose walls form the synchronizing electrode structure.

However, in these and other well known nozzle configurations, the nozzle structure is distinct and apart from the charge electrode. For example, in pending application Ser. No. 543600, filed Jan. 23, 1975, to Ernest Bassous, et al, the charge electrode structure is spaced from the nozzle mounting plate by means of spacers.

The importance of the charge electrode in an ink jet recording apparatus has been recognized and some contributions have already been made to its improvement. Thus, in U.S. Pat. No. 3,984,843, which issued to Lawrence Kuhn on Oct. 5, 1976, charge electrodes are formed by a diffusion into an array of passages in a semiconductor substrate. Each diffusion may be connected to a charging circuit comprising a latch circuit and a shift register, which can be formed in the front surface of the substrate.

Also, numerous anisotropic etchants are known for monocrystalline silicon which include alkaline liquids or mixtures thereof. These include aqueous sodium hydroxide, aqueous potassium hydroxide, aqueous hydrazine, tetramethyl ammonium hydroxide, mixtures of phenols and amines such as a mixture of pyrocatechol and ethylene diamine with water, and a mixture of potassium hydroxide, n-propanol and water. These and other preferential etchants for monocrystalline silicon are usable in the process of the present invention for forming the charge electrode.

As is known, in anisotropic etching, crystalline materials are attacked at different rates in different crystallographic directions. With respect to the three most common low index crystal planes in monocrystalline silicon, the etch rate is greatest for (100) oriented silicon, somewhat less for (110) oriented silicon and is least for (111) oriented silicon. The preferred embodiment of the present invention uses single crystal silicon of (110) orientation. For further information on etching technology suitable for carrying out this invention, reference may be made to U.S. Pat. No. 3,770,533, which issued on Nov. 6, 1973, and to the article in the Journal of Electrochemical Society, 1965, Vol. 114, page 1965 et seq.

The present invention differs over the prior art in that charge electrodes and associated drive circuitry are formed in a monocrystalline silicon of (110) orientation. Although silicon substrates of other orientations, e.g., (100), may be used, (110) oriented silicon is preferred since it results in a greater packing density, more efficient charging and reduced crosstalk for an array of charge electrodes. The inventive process also permits the fabrication of the charge electrodes in the same silicon substrate in which the ink jet nozzle and its associated synchronization electrode are fabricated. The use of the present process requires no photolithograhic steps after the charge electrode aperture is formed by anisotropic etching. This provides an important advantage over other processes, since adequate photolithography cannot be performed after the apertures are fabricated.

SUMMARY OF THE INVENTION

It is an object of this invention to provide a process for producing a charge electrode array in a single crystal silicon substrate of (110) orientation.

It is another object of this invention to provide a process for producing an integrated unit comprising a charge electrode array and ink jet nozzles in a single crystal silicon substrate of (110) orientation.

It is another object of this invention to provide a process for producing a monolithic device comprising charge electrode array, nozzles and synchronization electrodes in a single crystal silicon substrate of (110) orientation.

It is another object of this invention to provide an improved charge electrode array in a single crystal silicon substrate of (110) orientation for use in ink jet recording.

It is still another object of this invention to provide a monolithic device comprising a charge electrode array and nozzles in a single crystal silicon substrate of (110) orientation.

It is still another object of this invention to provide a monolithic device comprising a charge electrode array, nozzles and synchronization electrodes in a single crystal silicon substrate of (110) orientation.

The above and other objects are achieved by the disclosed process using single crystal silicon of (110) orientation. In this process for producing a charge electrode array, an n-type silicon substrate is thermally oxidized to provide a silicon dioxide layer over the entire surface, selected areas on one surface of the substrate are exposed after a masking operation, first p+ surface layers are diffused in the non-masked areas of this surface, a contact area is formed in each p+ layer, apertures adjacent to the p+ layers are etched through the substrate to form pyramidal apertures having vertical (111) side walls and second p+ layers, connected to the first p+ layers, are diffused into the exposed side walls of the apertures. A wire can be bonded to each contact area for electronic control by external circuitry of each aperture during the charging of drops of ink in the printing operation or, alternatively, a charging circuit can be fabricated in the same substrate as the apertures in accordance with conventional integrated circuit fabrication techniques. The integration of the charging circuit and charge electrode facilitates the packaging of the ink jet printing head, since the number of connections to the unit can be greatly reduced. It is understood that a p-type substrate can be used, in which case an n+ doping would be required in the diffused layers.

Furthermore, in accordance with this invention, the nozzle itself can be incorporated in the substrate on the opposite side from the charge electrode contact areas and made an integral part of the charge electrode array. In accordance with the embodiment, a p+ diffusion is performed in select areas of the substrate in the immediate vicinity of what it is to be the nozzle opening. The substrate is anisotropically etched through from the opposide side along the contour of the diffusion layer. The aperture walls are diffused with a p+ layer and then the entire surface other than the contact-making surface is coated with an insulating layer such as silicon dioxide. However, it should be understood that the second p+ diffusion can be replced by an n+ diffusion if a p-type substrate is used.

A drop synchronization electrode may also be formed in the charge electrode array. The substrate is anisotropically etched through to an insulating membrane which is then opened to a desired nozzle size. A conductive layer is placed on top of the insulating layer and covered by a second insulating layer such that the conductive layer is fully enclosed at the nozzle opening. An opening is made through the second insulating layer to the conductive layer to permit an AC signal to be placed on the conductive layer to permit electrohydrodynamic perturbation of the jet stream entering the charge electrode. The walls and a portion of the opposite surface are dropped with a p+ element, connected to a source of voltage and covered with an insulating layer.

DETAILED DESCRIPTION OF THE INVENTION

Figure 1:
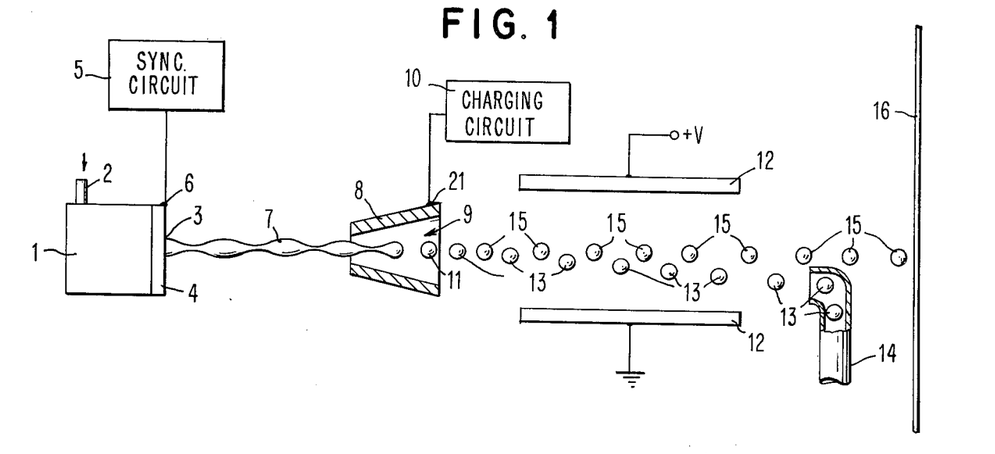
FIG. 1 is a schematic representation of an ink jet printing system showing the conventional relationship of the various elements, including the jet nozzle and charge electrode and their related circuitry.

Referring to the schematic representation of FIG. 1, ink in manifold 1, which is received from input tube 2, emerges at exit orifice 3 of nozzle 4, thereby forming a jet stream 7. An AC voltage applied by synchronization circuit 5 to synchronization electrode 6 causes the ink jet to be broken up into a stream 7 of synchronized drops. The ink jet stream is now in the region of the charge electrode 8.

Charge electrode 8, which is positioned near the point 9 of drop formation, receives a voltage at contact point 21 from charging circuit 10 which draws the charge out to the tip of the jet. Although the charge electrode is shown with the smaller orifice on the input side and the larger orifice on the output side, it should be understood that the charge electrode can be operated successfully in a reverse manner. As the drop 11 breaks off from the jet 7, it carries with it a charge proportional to the voltage applied to the charge electrode 8. The droplets then pass into a region of high field intensity created by a pair of deflection plates 12. The electric field causes charged drops to be deflected by an amount proportional to their charge and allows uncharged drops to pass through undeflected. The charged drops 13 are deflected into a catcher or gutter 14 for possible re-use and the uncharged drops 15 pass undeflected to strike the target paper 16.

Figure 2:
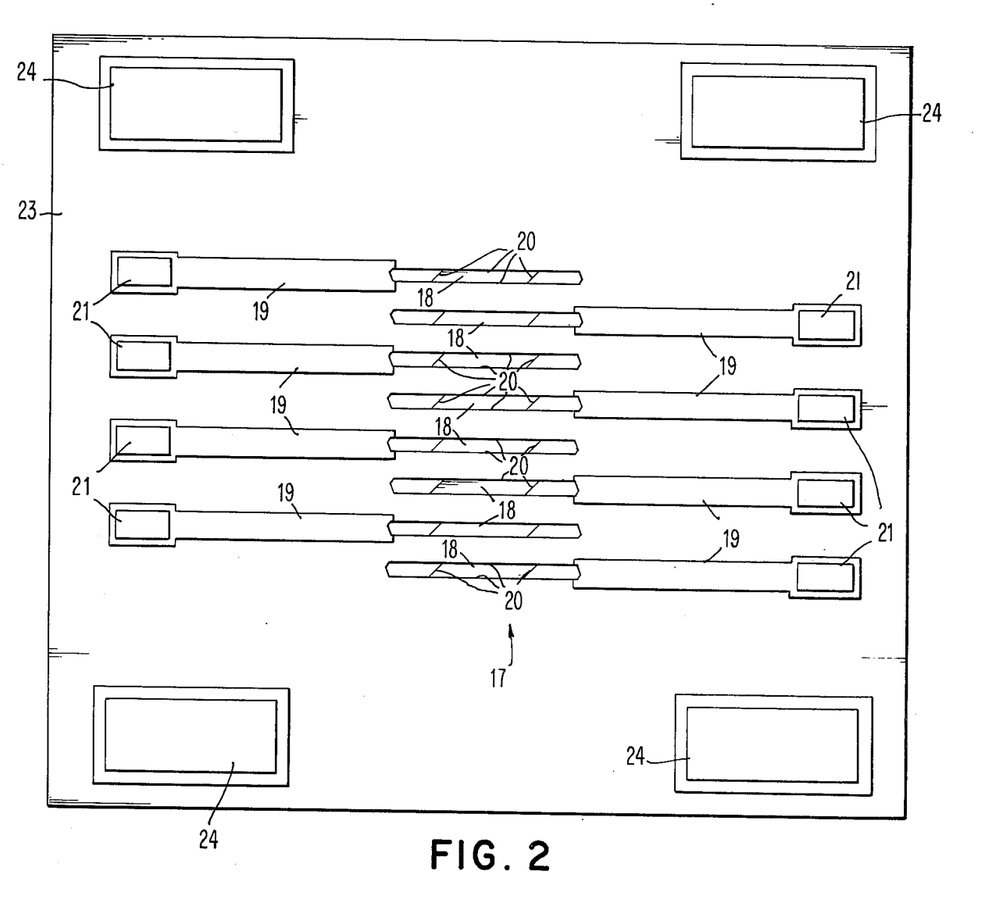
FIG. 2 illustrates a charge electrode array in accordance with one embodiment of the invention.

In the schematic representation of FIG. 1, a single charge electrode is shown. Actually, an array of charge electrodes could have been shown to permit the receipt of a plurality of jet streams from a multiaperture nozzle. Thus, in the embodiment of the present invention shown in FIG. 2, charge electrode array 17 is shown with eight apertures 18 in an n-type substrate 23 through which the ink jet stream and drops are passed, although it should be understood that many more apertures may form a charge electrode array. In accordance with the disclosed process which will be described in greater detail below, a p+ layer 19 is formed along one side of each aperture 18 and, another p+ layer (not shown) is formed along the walls 20 thereof. The larger end portion of p+ layer 9 contains a contact area 21 which receives the voltage from an externally located charging circuit that permits the charge electrode to draw the charge out to the tip of the jet when in aperture 18. Also shown in FIG. 2 are substrate contacts 24 in the four corners of the wafer which are used for testing and serve as a bias connection for the substrate when mounted for operation.

Figure 3:
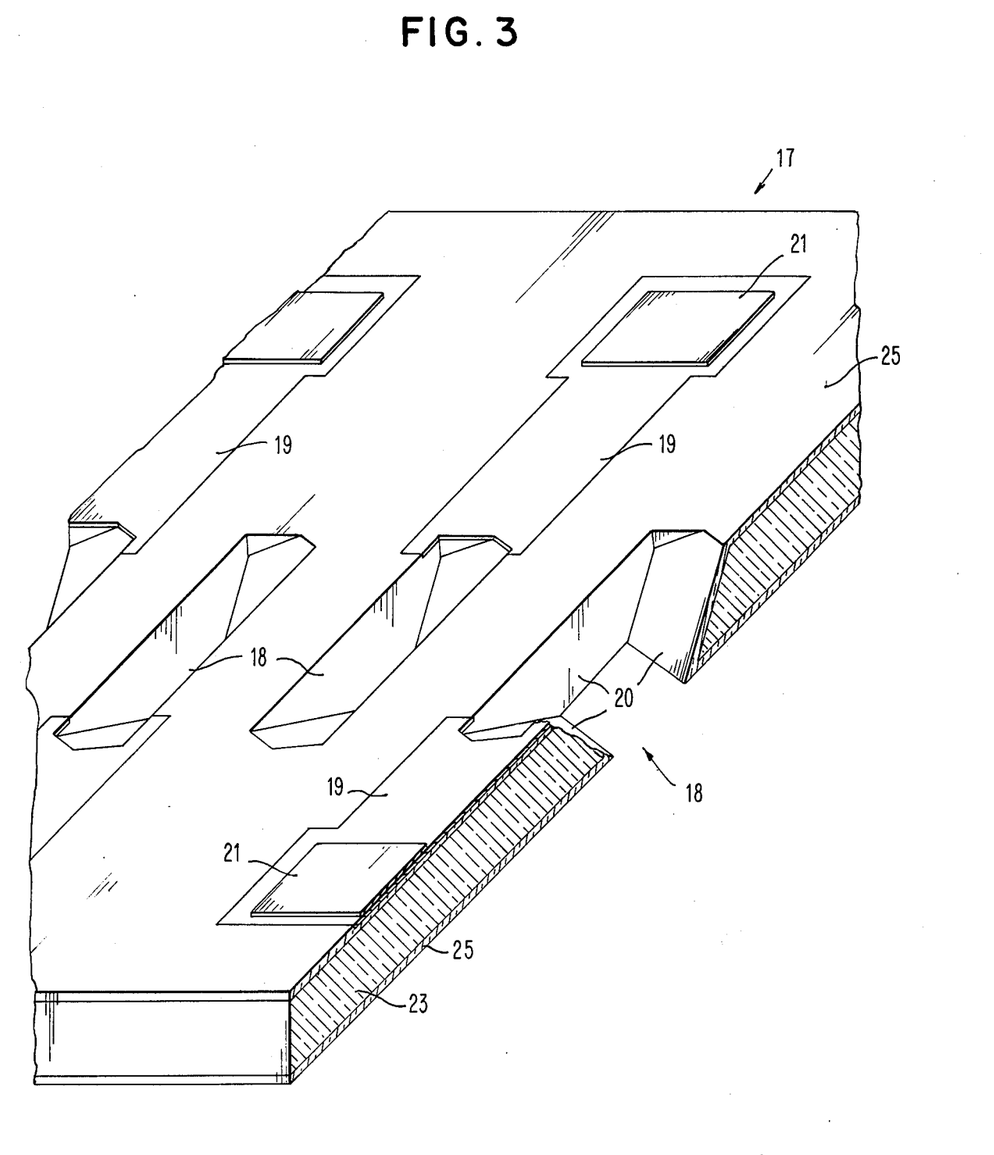
FIG. 3 is a partial, perspective view of FIG. 2 showing the interrelationship of the various charge electrode elements.

FIG. 3 shows in perspective a single charge electrode aperture 18 with its associated walls 20 (three are shown). The p+ diffusion 19 is shown connected to the walls of each aperture (which have a connecting diffusion) and forms, at its other end, a support for contact pad 21, which receives a voltage from a circuit external to the substrate when the charging circuit is not formed in the substrate. The configuration of the aperture walls is governed by the (110) orientation of the silicon substrate. A layer of insulating material 25, such as silicon dioxide, covers the entire substrate with the exception of the contact area.

Figure 4A:
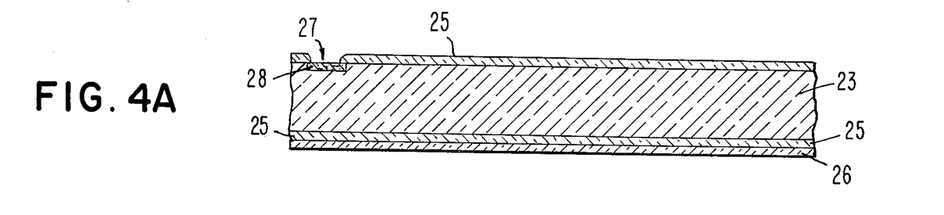
FIGS. 4A through 4F illustrate the processing steps in developing a single charge electrode.

FIGS. 4A through 4F illustrate the principal processing steps involved in fabricating a single charge electrode. Initially, a single crystal n-type substrate of (110) orientation, about 10 to 30 mils thick, is cleaned. Referring to FIG. 4A, the substrate is thermally oxidized to provide a $SiO_2$ film 25 over the entire front (top) and back (bottom) surface of substrate 23. Thermal oxidation occurs, for example, in steam at 1,000° C, which develops a $SiO_2$ film 25 of some 3,500 A thickness. However, the thickness of the $SiO_2$ film is not critical. After this operation, a 1200 A layer 26 of $Si_3N_4$ is then deposited on the back side by chemical vapor deposition. This is followed by the coating of the front side by a photoresist (not shown). An opening is developed in the photoresist and the $SiO_2$ layer 25 is then etched at this opening in buffered hydrofluoric acid to form slot 27. The photoresist is removed. A phosphorus deposition is made and diffused at the slot to provide an n+ contact 28 with the substrate 23. The substrate is reoxidized to form an oxide cover in the n+ contact area.

Figure 4B:
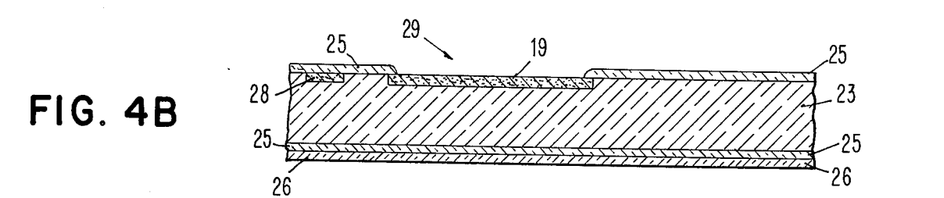

Referring to FIG. 4B the substrate face (top) is again coated with photoresist (not shown). This time rectangular openings are exposed and developed on the photoresist. The $SiO_2$ layer 25 is then etched in buffered hydrofluoric acid to open the contact pad area 29. A p+ diffusion 19 using boron is then made in the silicon substrate and reoxidation is performed at this point.

Figure 4C:
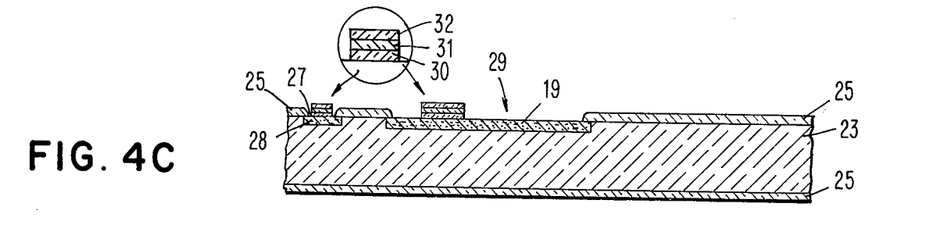

Referring to FIG. 4C, the next series of steps are aimed to define the contact areas to provide electrical contact when the device is completely fabricated. Areas 27 and 29 are now opened to expose Si. At this time areas 27 and 29 will not be exactly the same size as they were in FIGS. 4A and 4B, respectively. A triple layer consisting of 300A of $SiO_2$, 1500A of $Si_3N_4$ and 1500A of $SiO_2$ is formed on top of the substrate by chemical vapor deposition or some other comparable technique. Photoresist is then applied over the top layer and areas are opened up to permit the removal of all but a defined triple layer 30, 31, 32 in areas 27 and 29, as shown in FIG. 4C. The triple layer covers the selected regions on the substrate surface which will later define the region where the electrical contacts will be provided for the devices. It should be mentioned that at the time the $Si_3N_4$ layer is removed on top, except in the contact areas, it is also removed on the back surface. The silicon nitride layers are removed in boiling phosphoric acid ($H_3PO_4$) at 180° C.

Figure 4D:
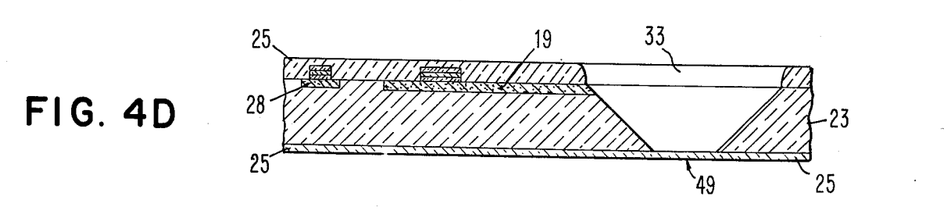

Thermal oxidation of approximately 3000A is now performed, followed by another $SiO_2$ layer deposited over the front surface, thereby building up layer 25 and covering the triple layer. Photoresist is then applied to cover the front and back surfaces and an area in the photoresist is opened in the front surface. Then, the $SiO_2$ layer is etched through to the substrate surface to form slot 33, as shown in FIG. 4D. The substrate is now ready for the formation of the charge electrode aperture by anisotropic etching.

The slot 33 is oriented such that its long side intesects the (110) surface plane vertically and is parallel to one set of the (111) plane of the wafer. This alignment is very important to avoid spreading and merging of the discrete slots during the subsequent anisotropic etching of the substrate. A slot 50 mils long will produce after etching an exit aperture 15 mils long, due to the sloping (111) sidewalls, for a wafer 10 mils thick. The width of the aperture is determined by the undercutting which results from the photolithographic process and the etching of the vertical (111) sidewalls, as well as by the degree of misalignment.

The silicon substrate, in the area of slot 33, is now etched in an anisotropic solution containing ethylene diamine, pyrocatechol and water at 118° C. When the silicon substrate is etched all the way through, an $SiO_2$ membrane 49, which forms a part of layer 25 on the bottom, will appear on the opposite side of the substrate, as shown in FIG. 4D. The $SiO_2$ membrane 49 is then etched in buffered hydrofluoric acid to provide a clear aperture through the entire substrate.

Figure 4E:
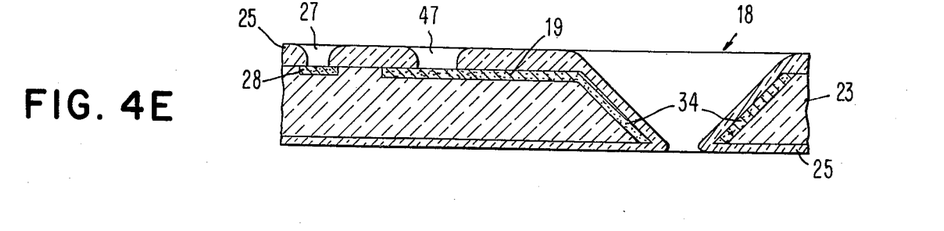

A number of steps are now carried out to generate the structure shown in FIG. 4E. These steps are carried out in the following sequence. A second p+ diffusion 34, using boron, is carried out in the exposed walls. Being of the same material and conductivity type as diffusion 19 and being connected thereto, it will cause the aperture 18 to be charged, as needed, during the printing operation, when a charge is applied to the first diffusion directly, as will be described below, or to the contact area. A layer of $SiO_2$ is then grown along the side walls of aperture 18 to provide electrical isolation and protection against corrosion caused by the ink.

Next sequentially, the top $SiO_2$ layer 32, the $Si_3N_4$ layer 31 and the bottom $SiO_2$ layer 30 are removed. The substrate contact area 27 and contact pad area 47 are exposed to their respective doped regions 28 and 19. The final chemical step involves the evaporation of palladium at a substrate temperature of about 200° C to form palladium silicide ($Pd_2Si$) contact 24 in area 27 and contact 21 in area 47, as may be seen in FIG. 4F. Other suitable metallurgy is applicable such as nickel silicide or platinum silicide.

More than one charge electrode array may be thus formed on a single substrate. Therefore, after scribing and dicing each charge electrode array chip, the latter is mounted and bounded to a holder. Wires are not bonded to each contact in the event that the charging circuitry and the charge electrode array are integrated on the same substrate chip. However, when charge electrode circuitry is fabricated on the same substrate as the charge electrode, interconnection may be made to the contact areas with diffused layers. Thus, two options are available. The charge electrode array may be mounted on a printed circuit board which has all the electronics for controlling the charge at the aperture and together the board and array may be mounted or bonded to the nozzle head. On the other hand, the electronics may be fabricated in the array wafer in conventional integrated circuit fashion simultaneous with the electrode fabrication and connected to the contact pad by metallization or diffusion, preferably the latter.

Figure 4F:
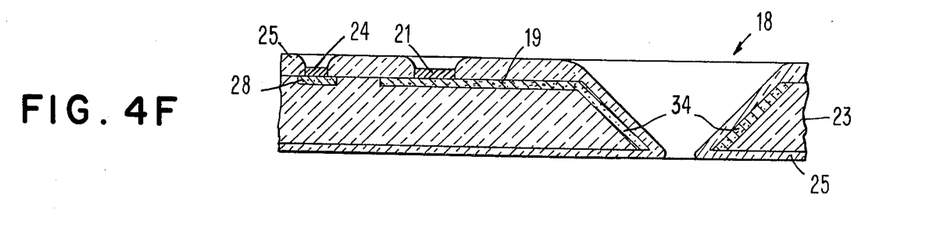
Figure 5:
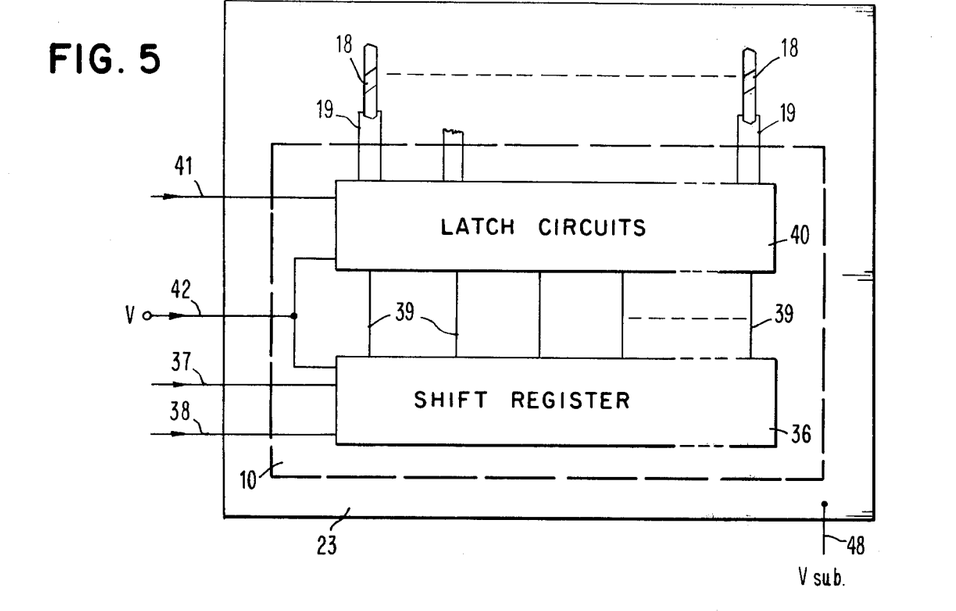
FIG. 5 illustrates a drive circuit formed in the substrate for operating the charge electrode, in accordance with another embodiment of this invention.

FIG. 5 illustrates a typical charging circuit 10 which may be fabricated in silicon substrate 23 to provide a voltage for the purpose of controlling the charge at each aperture 18 during the printing operation. The circuit comprises a shift register 36 which, in response to clock pulses on input line 37 and data pulses on input line 38, communicates signals on lines 39 for the purpose of operating latch circuits 40. Control of the operation of the latch circuits is also provided by clock pulses on input line 41. The potential for the latch circuits and shift register is provided by input line 42. Both the shift register and latch circuits are preferably fabricated from conventional FETs. The operation of one of the latch circuits 40 causes a voltage to be supplied to the corresponding diffused region 19 which is connected to diffused region 34 (shown in FIG. 4F) in the charge electrode walls of aperture 18. A bias voltage is provided at terminal 48 for the proper operation of charging circuit 10. This voltage may be applied to substrate contact 24 shown in FIGS. 2 and 4F. Integration of the charging circuit and charge electrode on the same substrate will facilitate the packing of the printing head. A more detailed description of this charging circuit is provided in previously identified U.S. Pat. No. 3,984,843.

Figure 6A:
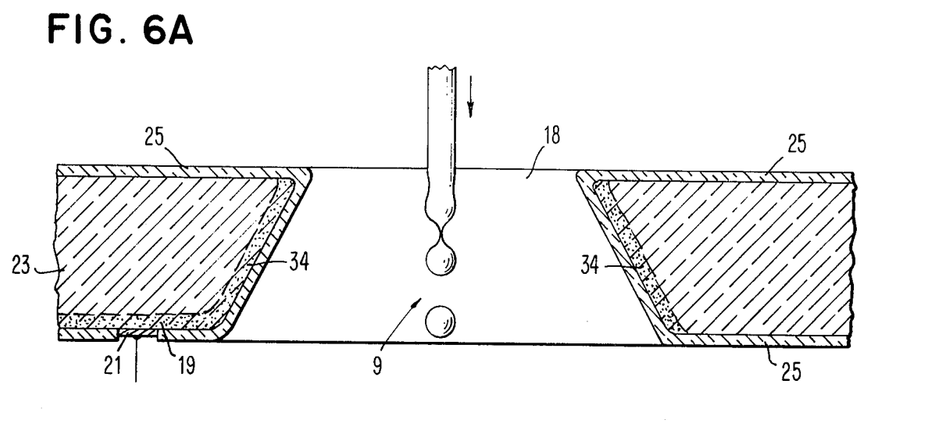
FIGS. 6A through 6C illustrate charge electrode, charge-electrode-nozzle unit and charge-electrode-nozzle-synchronization electrode unit, respectively.

FIG. 6A illustrates the charge electrode of FIG. 4F in an upside-down position with the jet stream shown coming down and breaking up at the point 9 of the aperture 18. The wall diffusion 34 extends through front diffusion 19 to contact 21, and is thus able to charge the jet stream droplets according to the voltage applied at contact 21. It is assumed that the charging signals are applied in such a fashion that the p+-n junction formed between the diffusion 34 and the sidewall is never forward biased. For instance, he substrate 23 could be biased at +30 volts and the charge electrode switched between +30 volts (for gutter drops) and 0 volts (for drops to the paper). Such a scheme ensures that if a diode (each aperature in the charge electrode array being functionally a diode) malfunctions due to a defect, the corresponding stream will go to the gutter rather than the paper. It also ensures that positive ions such as sodium ($Na^{30}$) will not be attracted to the $SiO_2$-Si interface where they might cause instability of the device.

It will be noted that the entrance to the aperture 18 in FIG. 6A is wide and, therefore, it is necessary for the jet stream to be emitted by a nozzle separate and distinct from the charge electrode. Insulating film 25, e.g., silicon dioxide, covers all but the contact surface.

Figure 6B:
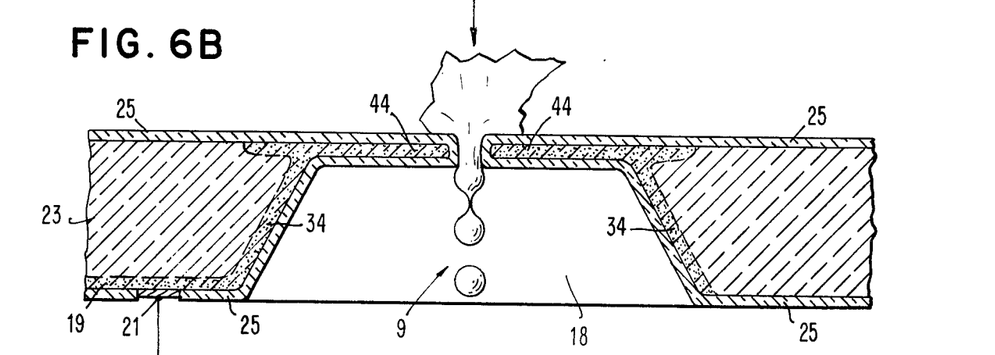

In FIG. 6B, it is shown how a nozzle may be formed in the same substrate with the charge electrode. This is accomplished using the method described in the earlier noted U.S. Pat. 3,921,916. To fabricate a nozzle-charge electrode structure it is necessary to carry out a front-to-back alignment in order to position each opening or nozzle opposite its corresponding charge aperture. A suitable membrane is located in the area of the desired opening on the back surface of the substrate and a p+ diffusion 44 is accomplished in the substrate 23 adjacent the membrane. Then, anisotropic etching is commenced from the front side (as in FIG. 4D, for example) and a slot is formed extending through to the diffused region, at which time the aperture wall follows the contour of the diffused layer to form a membrane and orifice which serves as a nozzle. A P+ dopant layer 34 is also diffused along the walls of the aperture. It is understood that the face diffusion 19 along with associated contact 21 could have been laid earlier. After an insulating layer 25, such as silicon dioxide, is grown over the entire surface of the substrate, the contact area to the substrate 23 is opened and contact metallization is applied. The fabrication of the nozzle-charge electrode combination is now essentially complete. It should be understood that the diffusion layer 44 forming the nozzle and diffusion layer 34 in the aperture walls may be connected and may be formed of different materials. This combined unit is then connected to an ink manifold or store which provides the ink to the nozzle.

Figure 6C:
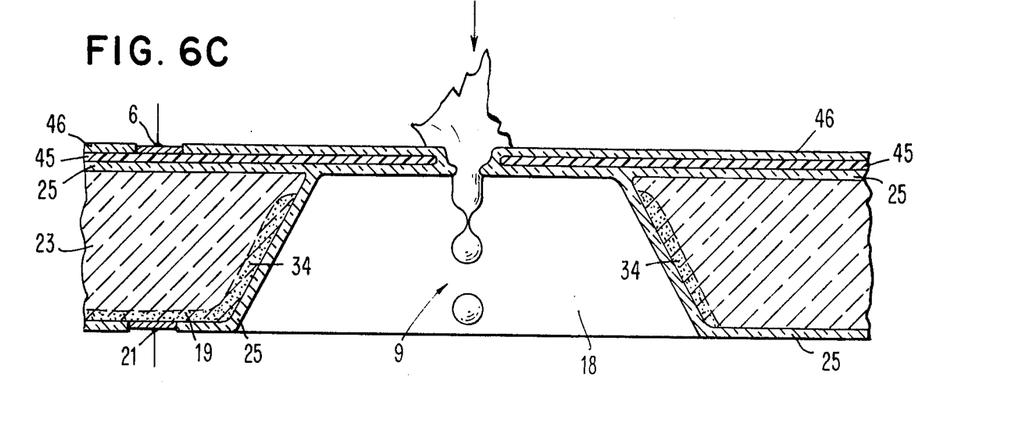
Figure 7:
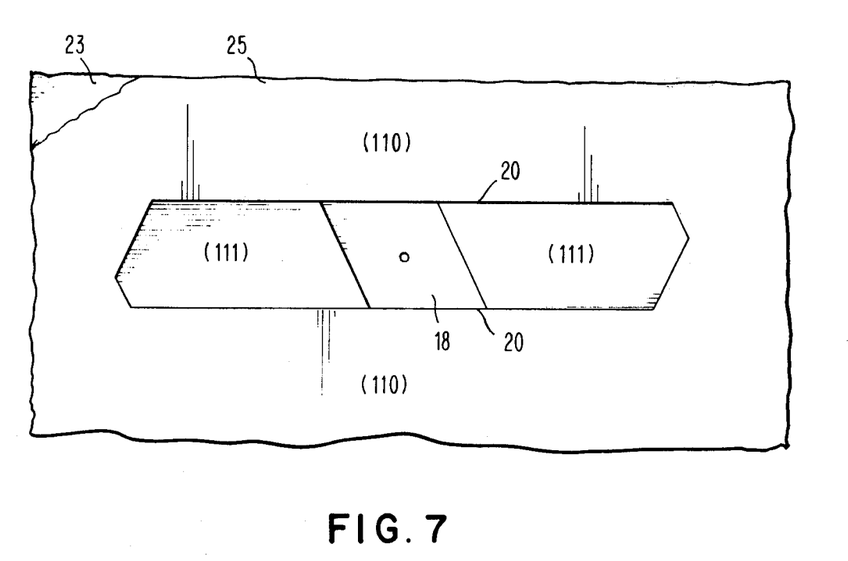
FIG. 7 illustrates a charge electrode after the nozzle is formed.

Whereas FIG. 6A shows the completed charge electrode, FIG. 6B shows a charge electrode-nozzle combination which uses a silicon membrane. FIG. 6C shows a monolithic unit of a charge electrode, nozzle and synchronization electrode.

FIG. 6C illustrates a unit which uses an insulating membrane as described in previously identified U.S. Pat. 3,958,255, and by suitable augmentation provides the additional feature of a synchronization electrode. An insulating layer 25 is formed the length of the back (top) of substrate 23 before the anisotropic etching of the aperture occurs. Upon completion of the etching operation, an opening of desired size is made in the layer 25 which will serve as a nozzle. A conductive layer 45 is placed on top of insulating layer 25 and then insulating layer 46 is placed or grown on top of the conductive layer 45. An opening is made in layer 46 to conductive layer 45 and a contact 6 inserted. An AC voltage will be provided at contact 6 by synchronization circuit 5 (see FIG. 1) to cause the synchronization electrode to perturb electrohydrodynamically the ink jet stream at the nozzle. Synchronization is achieved by the fringe fields extending through the insulating membrane 46 to the jet stream entering charge electrode aperture 18. The charge electrode portion of this combination is formed as previously described with relation to FIGS. 4A-4F.

It should be understood that layer 45 (FIG. 6C) may be of any suitable electrically conducting material, e.g., aluminum, and the insulating material may be some other material or combination of materials other than silicon dioxide. As for the materials, they may be laid, deposited or grown in a conventional manner.

Although the invention has been illustrated in detail with the use of specific materials and thicknesses, it should be understood that these are not critical and may be substituted by other materials and thicknesses. Other materials singly or in combination may be used. Thus, $Si_3N_4$ or another insulator may be placed on top of the $SiO_2$ for additional protection when certain inks are used in some applications. Phosphoric acid is often used to dissolve silicon nitride while dilute and buffered hydrofluoric acid is used to dissolve silicon dioxide. The p+ surface layer may be developed by diffusion or ion implantation, and, as noted before, an n+ diffusion may be used in a p substrate. Also, it is understood that various conventional inspection and cleaning operations are appropriate in the course of the development of the various structures in accordance with this invention. However, these and other variations of the invention and in the steps of fabrication will be apparent to skilled artisan.

What is claimed is:

1. A charge electrode array in an ink jet recording apparatus for controlling the charge of droplets formed from a plurality of liquid streams comprising:

a monocrystalline silicon substrate of (110) orientation having a plurality of apertures extending therethrough, with each of the apertures having one of the liquid streams pass therethrough with droplets being produced from the stream while in the aperture;

a first diffused region of the opposite type of conductivity to the type of conductivity of said substrate in the walls of each said aperture;

a second diffused region of the same conductivity as the first diffused region extending from and connected to said first diffused region to provide an electrical contact surface for receiving a voltage to control the charge electrode during the printing operation; a third diffused region of the same conductivity type as the substrate and having an electrical contact surface for receiving a bias in said substrate and located on the side with said second diffused region; and an insulating layer over the entire array, other than the external contact surfaces.

2. A device according to claim 1 in which a charging circuit is electrically connected to said charge electrode array to control the placement of the charge on each charge electrode in accordance with whether the droplet within said charge electrode aperture is to be applied or not be applied to the recording medium.

3. A device according to claim 2 in which said charging circuit is fabricated in said silicon substrate and connected to said second diffused region of each charge 4. A device according to claim 1 in which said substrate is n-type material and said first and second regions are p$^+$ diffusions.

5. A device according to claim 1 in which the outermost extension of said second diffused region is wider than the portion connected to said first diffused region to provide adequate area for supporting an electrical contact.

6. A monolithic unit in an ink jet recording apparatus formed of a single crystal silicon substrate of (110) orientation comprising a charge electrode array for causing the droplets of jet streams to be electrically charged and a plurality of membrane nozzles each of which is integrally connected to each charge electrode of the array for passing a jet stream under pressure into said charge electrode.

7. A device according to claim 6 which said substrate is n-type material.

8. A device according to claim 6 in which said charge electrode array comprises a plurality of apertures, a first diffused region of the opposite type of conductivity to the conductivity of said silicon substrate in the walls of each aperture, a second diffused region of the same conductivity as the first diffused region extending from said first diffused region to provide an electrical contact surface for receiving a voltage to control the charge electrode during the printing operation, a third diffused region on the same side of the substrate as the second diffused region having an electrical contact surface for receiving a bias, and an insulating layer covering the entire array other than the electrical contact surfaces.

9. A device according to claim 8 in which each membrane nozzle is formed in the silicon substrate by a fourth diffused region located under said insulating layer on the side opposite said second and third diffused regions.

10. A device according to claim 8 in which said first and second regions are p+ diffusions and said third region is an n+ diffusion.

11. A device according to claim 8 in which the apertures have pyramidal structures.

12. A monolithic unit in an ink jet recording apparatus formed of a single crystal silicon substrate of (110) orientation comprising a charge electrode array for causing the droplets of jet streams to be electrically charged, a plurality of membrane nozzles each of which is integrally connected to each charge electrode of the array for passing a jet stream under pressure into said charge electrode, and a synchronization electrode integrally connected to said nozzle for providing an electric field for electrohydrodynamically perturbing the jet stream emitted by said nozzle.

13. A device according to claim 11 in which said charge electrode array comprises a plurality of apertures, a first diffused region of the opposite type of conductivity to the conductivity of the silicon substrate in the walls of each aperture, a second diffused region of the same conductivity as the first diffused region extending from said first diffused region to provide an electrical contact surface for receiving a voltage to control the charge electrode during the printing operation, a third diffused region on the same side of the substrate as the second diffused region having an electrical contact surface for receiving a bias, and an insulating layer covering the entire array other then the electrical contact surfaces.

14. A device according to claim 13 in which each membrane nozzle is formed by an opening in said insulating layer on the substrate side opposite said second and third diffused regions.

15. A device according to claim 14 in which said synchronization electrode comprises a conductive layer on the first insulating layer which forms the membrane nozzle and in which a second insulating layer covers said conductive layer and connects with said first insulating layer at the nozzle side, with said second insulating layer having an opening therein to expose a portion of said conductive layer which serves as an electrical contact surface to receive a voltage from an external source.

16. A method of forming a charge electrode array in a single crystal substrate of (110) orientation for use in an ink jet recording apparatus for controlling the charging of droplets formed from a plurality of streams passing through the charge electrode apertures comprising the steps of:
forming an insulating layer over the entire substrate;
forming first diffused regions of the same conductivity type as the substrate through openings in said layer on the front side of said silicon substrate for receiving a bias;
forming second diffused regions of opposite conductivity as the substrate through openings in said layer on the front side of said silicon substrate for receiving a voltage to control the charging of ink droplets;
defining contact areas in the first and second diffused regions;
adding to said insulating layer to cover said first and second diffused regions and defined contact areas;
forming apertures adjacent said second diffused regions through said front layer, the silicon substrate and said back layer;
forming third diffused regions in the walls of the apertures connected to said second diffused regions;
forming an insulating layer over said third diffused regions;
forming electrical contacts through openings in the front insulating layer on said first and second diffused regions to permit voltages to be applied for operating the charge electrode array.

17. A method according to claim 16 comprising the additional steps of:
forming a charging circuit on the front side of said silicon substrate and electrically connected to said second diffused regions to provide a selective charge through said third diffused regions on the jet streams passing through the charge electrode apertures.

18. A method of forming a charge electrode array in a single crystal silicon substrate of (110) orientation for use in an ink jet recording apparatus for controlling the charging of droplets formed from a plurality of liquid streams passing through the charge electrode apertures comprising the steps of:
forming an oxide layer over the entire substrate;

coating the surface of the substrate to permit exposure of a first group of areas on the face of the substrate;

exposing and developing said first areas;

diffusing a first dopant into the exposed first areas of the same conductivity type as the substrate;

coating the surface of the substrate to permit exposure of a second group of areas;

exposing and developing said second areas;

diffusing a second dopant into the exposed second areas having a conductivity type opposite from the conductivity type of the substrate;

forming an oxide layer over the entire substrate;

coating the surface of the substrate to permit exposure of the first and second areas;

exposing and developing said first and second areas;

placing first, second and third layers on the substrate surface;

coating the third layer to permit removal of all but a defined triple layer in the first and second areas;

forming an oxide layer over the entire substrate;

coating the surface to permit exposure of a third group of areas adjacent the second group of areas;

exposing and developing said third group of areas to the substrate surface;

anisotropic etching through the entire substrate in the third areas to the insulating layer on the opposite side of the substrate;

removing the membrane portion of the insulating layer on the opposite side to form the charge electrode aperture;

diffusing a third dopant having the same conductivity type as the second dopant in the exposed sidewalls of each aperture, said second and third diffused regions being connected together;

forming an oxide layer along the side walls to electrically isolate each diffused region and protect against corrosion caused by ink jet passage;

removing the three layers in said first and second areas to the substrate surface; and placing a metallization in the first and second areas to provide electrical contacts to permit voltages to be applied for operating the charge electrode array.

19. A method according to claim 18 in which the substrate is n-type material.

20. A method according to claim 19 in which a phosphorus diffusion creates an n+ contact in the first areas.

21. A method according to claim 19 in which a boron diffusion creates p+ regions in the second and third areas.

22. A method according to claim 18 in which the three layers comprise a first layer of silicon dioxide, a second layer of silicon nitride and a third layer of silicon dioxide.

23. A method according to claim 18 in which the electrical contact in the first and second areas is palladium silicide.

24. A method according to claim 18 in which the apertures have pyramidal structures.

25. A method for fabricating a monolithic unit of a plurality of charge electrodes and nozzles for use in an ink jet recording apparatus formed in a single crystal silicon substrate of (110) orientation comprising the steps of:

forming an insulating layer over the entire substrate;

forming first diffused regions through openings in said layer on the front side of said silicon substrate for receiving a bias;

forming second diffused regions through openings in said layer on the front side of said silicon substrate for receiving a voltage to control the charging of ink droplets;

defining contact areas in the first and second diffused regions;

adding to said insulating layer to cover the first and second diffused regions and defined contact areas;

forming third diffused regions to define the nozzle orifices on the back side of said silicon substrate;

forming apertures adjacent the second diffused regions through said front layer and the silicon substrate along the contour of said third diffused regions;

forming fourth diffused regions in the walls of the apertures connected to said second diffused regions;

forming an insulating layer over said third diffused regions; and forming electrical contacts through openings in said front insulating layer on said first and second diffused regions to permit voltages to be applied for operating the charge electrode array.

26. A method according to claim 24 in which the first, second and third diffused regions are formed by coating the surface to permit exposure of the selected areas;

exposing and developing the selected areas; and diffusing a dopant in the selected areas.

27. A method according to claim 25 in which the dopants in the second, third, and fourth regions are of a different conductivity than the conductivity of the substrate.

28. A method for fabricating a monolithic unit of a plurality of charge electrodes, nozzles and synchronization electrodes for use in an ink jet recording apparatus formed in a single crystal silicon substrate of (110) orientation comprising the steps of:

forming an insulating layer over the entire substrate;

forming first diffused regions through openings in said layer on the front side of said silicon substrate for receiving a bias;

forming second diffused regions through openings in said layer on the front side of said silicon substrate for receiving a voltage to control the charging of ink droplets;

defining contact areas in the first and second diffused regions;

adding to said insulating layer to cover the first and second diffused regions and defined contact areas;

forming apertures adjacent said second diffused regions through said insulating layer on the front side and the silicon substrate to the insulating layer on the back side;

forming third diffused regions in the walls of the apertures connected to said second diffused regions;

forming nozzle orifices in the insulating layer on the back side with each orifice having approximately the same central axis as the aperture;

placing a conductive layer on the insulating layer adjacent each nozzle orifice to serve as a synchronization electrode;

placing a second insulating layer on the conductive layer with the first and second insulating layers being connected at each nozzle orifice;

forming an insulating layer over said third diffused regions;

forming electrical contacts through openings in the front insulating layer on said first and second diffused regions to permit voltages to be applied for operating the charge electrode array; and opening the second insulating layer to expose the conductive layer to permit electrical contact to be formed on the conductive layer.

29. A method according to claim 27 in which the conductive layer is metal.

30. A method according to claim 27 in which the conductive layer is a heavily doped semiconductor film.

* * * * *